Aug. 17, 1948.  C. A. HISSERICH  2,447,336
FLUXION METER
Filed Nov. 13, 1943
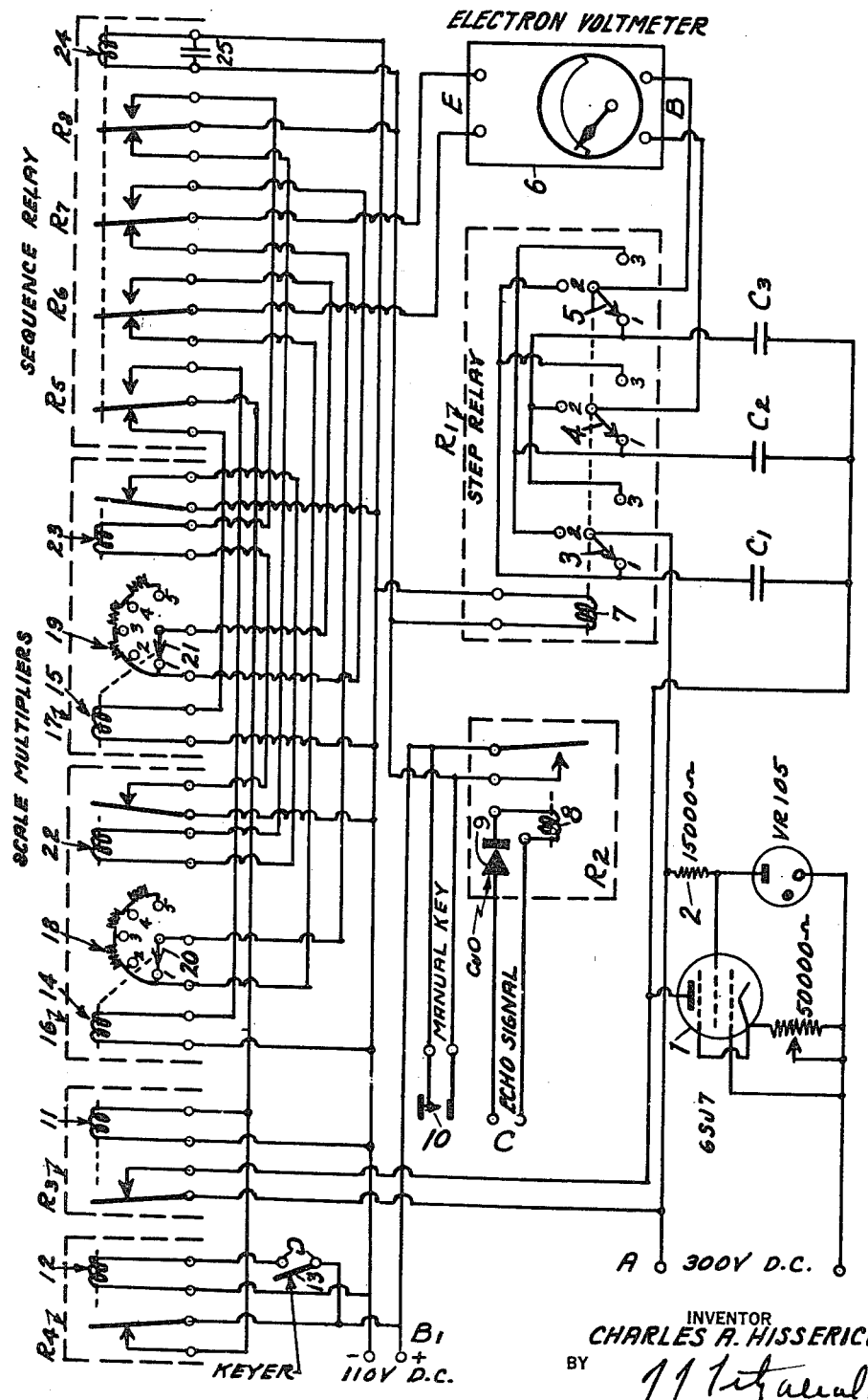
INVENTOR
CHARLES A. HISSERICH
BY
ATTORNEY Patented Aug. 17, 1948

2,447,336

UNITED STATES PATENT OFFICE 2,447,336

FLUXION METER

Charles A. Hisserich, San Diego, Calif., assignor to the United States of America as represented by the Secretary of the Navy Application November 13, 1943, Serial No. 510,243

13 Claims. (Cl. 177—352)

This invention relates to a method and apparatus, to be used in conjunction with certain standard sound gear equipment, upon which it is dependent for operating signals, in order to indicate accurately the rate of change of range.

It is often desirable to measure the rate of change of a quantity, or as might be said, the difference between two constantly varying quantities. Particularly is this true where the variation occurs over variable, repeating, time increments.

Thus, where a quantity produced during one increment of time is to be compared with another quantity measured over another period of time it is possible to measure that difference while preparing still a third quantity measured over still another period.

It is thus, the purpose of my invention to measure such differences and thereby obtain the rate of change; and the method of accomplishing this purpose is also a further object of this invention.

Another object of this invention is a method for measuring the rate of change of a constantly varying quantity and a device for accomplishing this result.

A further object of this invention is a method for constantly indicating differences between two quantities whose values are proportional to time increments.

Still another object of this invention is a device utilizing a constant current vacuum tube to control the charging of a series of condensers in sequence and measuring the difference between the charges on adjacent condensers, which charges are proportional to the two quantities to be compared.

A still further object is a device for indicating the rate of change of a quantity by comparing its static value at two different times.

This device finds particular usefulness in measuring the rate of change of the range of a target, in conjunction with the use of sound gear, and it is this application which is described herein. It is to be clearly understood, however, that the description as given is illustrative only and that the invention may be utilized, as will be obvious to those skilled in the art, wherever it is desirable to accomplish the above named object.

It consists primarily of three condensers which are charged (through a constant current vacuum tube) and shorted in sequence, the length of time for charging being dependent upon the elapsed time between pulses occurring in successive pairs. An electronic voltmeter is used to measure the difference between the charges carried by two of the condensers, while the third is charging; and on the receipt of the second of a pair of pulses, the meter is re-connected to measure the difference between the charge on the condenser just charged and one already charged, while the remaining condenser is recharged (after having been short circuited to remove the previous charge). Thus, there is made available a continuous reading of rate of range change.

At present there are several devices and methods in use for measuring distances by means of sound gear designed to product a signal and receive the reflected echo. Since the velocity of sound in any relatively homogeneous medium is relatively constant, the time elapsing between the signal and the echo can be used as a measure of the distance between the point of emission and the target. This general method is widely used at sea in measuring the distance to bottom, to other ships, and to other submerged or floating bodies. It finds particular application in submarine warfare, where it is of great importance to know the distance to an attacking ship or submarine.

However, although the bearing and range of a target are of primary importance, it would be desirable to know also the rate of change of that range. A device for accomplishing this purpose would not only allow the use of more accurate tactics, but it would enable the user to estimate exactly when such tactics should be begun. For instance, if a destroyer is attacking a submarine, there is only an exceedingly short period of time in which depth bombs, etc., can be successfully dropped. The more accurate the information on hand, the better are the chances of successfully destroying the submarine.

The device, as illustrated herein, is designed for use with a sound apparatus of the echo ranging type which supplies range and bearing or of the listening type which supplies bearing only. If the attacking ship is echo-ranging, the echo ranging device is of standard design and is arranged to emit short pulses of sound at regular intervals and receive the echo when it returns. The invention is designed to be used as an auxiliary to this equipment and may be attached to existing terminals without any rearrangement or alteration of it. When so used, the sound operator may read, in addition to range and its change (on the standard equipment), the rate of range change as well.

Present practice with the standard sound gear utilizes a very unreliable method for obtaining the rate of range change. The signal-echo return time is obtained in each case by means of a stop watch and a mental calculation is attempted by some individual in an effort to estimate the rate of change. The unsatisfactory nature of this procedure can be appreciated when it is understood that the critical range in antisubmarine attacks occurs at a range of about 500 yards. At this point, the plan of attack must be partially defined; but also at this point, the submarine's escape tactics play their most important part. It may adopt four plans of escape as follows: (1) stop, (2) speed up, (3) turn toward the attacking ship, or (4) turn away from the attacking ship. In either of the latter maneuvers a very definite change will take place in the rate of range change, its direction being dependent on whether the submarine turns toward or away from the ship. Confusion often results and the invention eliminates this completely by providing immediate information on the direction of this change.

In the drawings, the figure represents a schematic wiring diagram of my invention.

Since the standard equipment reads range on a time scale, it is therefore necessary that means be provided for accurately measuring time increments, so as to get the rate of change, and to convert these increments into electrical form so that they may be easily read. To accomplish this purpose, I have provided a constant current source (a power supply whose current is controlled by a pentode) to charge condensers. Since the current into the condensers does not vary with time, it follows that the voltage across the condenser will vary linearly with time. This current is then used to charge the condensers.

A source of regulated D. C. voltage is supplied at terminals A and connected to a constant current tube 1. The tube is regulated by means of resistor 2 and controls the current to charge condensers $C_1$, $C_2$, and $C_3$. This is done by connecting it to arm 3 of one gang of a three gang continuously rotatable step relay $R_1$ so as to charge each of the three condensers $C_1$, $C_2$, and $C_3$ in sequence as it rotates. The arms 4 and 5 of the two other gangs are connected to the two terminals B of an electronic voltmeter generally designated 6, which is calibrated with a dial to read rate of range change. The contacts of $R_1$, as can be seen in the drawing, are arranged so that while any one of the condensers is being charged through the constant current tube 1, the voltmeter 6 is connected so as to measure the difference in potentials created by the charges on the other two condensers.

Relay $R_1$ is operated by coil 7, connected across the terminals $B_1$ of 110 volt D. C., interrupted by relay $R_2$. Relay $R_2$, in turn, is actuated by coil 8, in series with the echo signal which occurs at intervals across terminals C on the standard gear. This echo signal is, of course, rectified by a CuO rectifier 9 as shown in the drawing. Additionally, it should also be noted that relay $R_1$ may be actuated by a manual key 10, as well as relay $R_2$.

Relay $R_3$ is utilized to short circuit each of the condensers in sequence, the coil 11 of which is actuated by relay $R_4$. The coil 12 of relay $R_4$ is in series with key 13 connected across the transmitter terminals D of the standard gear. The key 13 is designed to remain open while the signal is being transmitted, but is closed at all other times. The key is operated by the sound gear.

Relay $R_2$ is also arranged to operate a double throw relay $R_5$. Relay $R_5$ is connected to alternately operate the step coils 14 and 15 on scale multipliers, generally designated 16 and 17, respectively.

The scale multipliers 16 and 17 consist of tapped resistors 18 and 19, and arms 20 and 21 (operated by step coils 14 and 15), respectively. As the arms 20 and 21 are stepped in a clockwise direction, additional resistance is introduced, except in the case of the first steps, the contacts on which are directly connected.

The arms 20 and 21 on tapped resistors 18 and 19 are connected through two double throw relays $R_6$ and $R_7$ to terminals E on voltmeter 6, in such a way as to connect the terminals across one or the other of the scale multipliers, depending upon the direction the relays are thrown. The scale multipliers 16 and 17 are also provided with release coils generally designated 22 and 23, respectively, which coils are designed to return arms 20 and 21 to their original positions (shown in the drawings) and are operated alternately by a double throw relay $R_8$.

Relay $R_8$ and its operating coil 24 are connected to receive current through relay $R_2$, described above. Relays $R_5$, $R_6$, $R_7$ are all mechanically connected to relay $R_8$ and are thus operated as a unit when an echo signal causes operation of relay $R_2$. Thus, in the drawings, the relay arms on these relays are positioned either all to the right or all to the left. In this same connection, it should also be noted that condenser 25 is placed in parallel with coil 24 in order to introduce a slight delay in the operation of relay $R_8$ (and its connected relays) for the purpose of insuring the operation of release coil 22 (or 23) before relay $R_8$ operates to cut off the current flowing through it.

The circuit described above is also provided with several refinements to afford more positive operation. One such refinement includes slugging coil 8 in relay $R_2$ in order that the relay will be held in until all of the actuating functions are complete and to insure against double actuation caused by echo pairs.

The electronic voltmeter 6 is a vacuum tube device. It must have a high input impedance of the order of twenty megohms. As has been described, the scale multipliers 16 and 17 consist of tapped resistances and are so calibrated with respect to the electronic voltmeter that as arms 20 and 21 progress from tap to tap the scale reading on the voltmeter is reduced to one half, one third, one quarter, etc.

In operation, assume that a signal is emitted at terminals D, while switch 13 is open. Condenser $C_1$ is shorted, as contact arms 3, 4, and 5 are in their first positions as shown in the drawings; and relays $R_5$, $R_6$, $R_7$, and $R_8$ are all in the left hand position with arm 20 on scale multiplier 16 at tap 2.

When the signal ends, switch 13 closes, opening relays $R_4$ and $R_3$, $C_1$ begins to take on a charge through tube 1 and voltmeter 6 reads the difference in voltage on condensers $C_2$ and $C_3$. Voltmeter terminals E are connected through tap 2 of scale multiplier 16.

When the echo from the first signal is received at terminals C it operates relay $R_2$ which steps relay $R_1$ to position 2. This leaves the charge on condenser $C_1$ and connects the voltmeter 6 across condensers $C_3$—$C_1$. Operation of relay $R_2$ also actuates, in order, release coil 22 (returning arm 20 to tap 1) through relay $R_8$ and relays $R_5$, $R_6$, and $R_7$, leaving them in the right hand position.

As the second signal is emitted, switch 13 opens, closing relays $R_4$ and $R_3$ which latter in turn shorts condenser $C_2$. Step coil 14 steps arm 20 to tap 2 on scale multiplier 16. When the signal ends, switch 13 is closed and relays $R_4$ and $R_3$ are opened allowing $C_2$ to begin to charge with the voltmeter reading the difference in voltage on condensers $C_3$ and $C_1$. Voltmeter terminals E are connected through tap 2 on scale multiplier 17.

As the second echo is received, relay $R_2$ operates relay $R_1$ advancing its arms 3, 4, and 5 to position 3. This leaves the charge on condenser $C_2$ and connects the voltmeter across condensers $C_1$ and $C_2$. Relay $R_2$ also connects the voltmeter across condensers $C_1$ and $C_2$. Relay $R_2$ also causes actuation of release coil 23 through relay $R_8$ and throws relays $R_5$, $R_6$, and $R_7$ to the left position.

When the third signal is emitted, switch 13 opens closing relays $R_4$ and $R_3$. The latter shorts condenser $C_3$ and the former supplies current through relay $R_5$ to operate step coil 15 and arm 21 progresses to tap 2 on scale multiplier 17. When the signal ends, switch 13 closes, relays $R_4$ and $R_3$ open, allowing condenser $C_3$ to begin to charge. The voltmeter now reads the difference in voltage on condensers $C_1$ and $C_2$ and its terminals E are connected through tap 2 on scale multiplier 16.

As the third echo is received at terminals C, relay $R_2$ operates relay $R_1$ advancing arms 3, 4, and 5 back to position 1. This leaves the charge on condenser $C_3$ and connects the voltmeter 6 across condensers $C_2$ and $C_3$. The same echo causes current to be supplied to step coil 15 to step arm 21 on scale multiplier 17 to tap 2, and throws relays $R_5$ and $R_8$ to the right position.

When the fourth signal is emitted, switch 13 opens and relays $R_4$ and $R_3$ close, which latter in turn actuates step coil 14 on scale multiplier 16 to tap 2. Relay $R_3$ also shorts out condenser $C_1$ and puts the system in the same situation as was assumed above, except that relays $R_5$—$R_8$ are in the right, rather than the left-hand position.

As condenser $C_1$ was being charged, the meter read the difference in voltage between the charges on condensers $C_2$ and $C_3$. Condenser $C_1$ took on a charge proportional to the length of time elapsing between the first signal and the first echo. In the next sequence, condenser $C_2$ took on a charge, but it was proportional to the length of time elapsing between the second signal and echo. During the third sequence, when condenser $C_3$ was charging, voltmeter 6 was measuring the difference between the two charges on condensers $C_1$ and $C_2$. Since the charge on condenser $C_1$ was proportional to the range of the target at the time of the first echo reception and the charge on condenser $C_2$ is proportional to the range of the target at the time of the second echo reception, the measured difference between the two potentials was also a measure of the range change during the period between the emission of the first and second signals. This was necessarily true because the frequency of the signals remained fixed, and the voltmeter was calibrated to read rate of range change.

During the next sequence, the change in range between the second and third signals, as measured by comparing the charge on condensers $C_2$ and $C_3$, is indicated, and so on as the sequences are continued. Thus, an indication of such change is given to the operator at all times.

The purpose of the scale multipliers 16 and 17 is to automatically correct the voltmeter scale in the event that one or more echo signals are missed. This is a common occurrence because operators are taught to sweep the target to signal extinction and it may be at this remote point that the echo returns, but is not picked up by the receiving gear.

As an example, suppose the device is operating normally with condenser $C_1$ charging and the difference between $C_2$ and $C_3$ being compared, which we will assume were charged to 22 and 20 volts, respectively. Suppose also that had the echo been picked up the charge on condenser $C_1$ would have been 18 volts. If the echo is missed, relay $R_2$ fails to operate relay $R_1$ and arms 3, 4, and 5 are not advanced. However, when the signal operates relays $R_4$ and $R_3$ condenser $C_1$ is shorted out and put back in the circuit to receive a charge proportional to range which would have been taken by the condenser next in order. If the range were decreasing at a uniform rate, this new charge would be 16 volts. During the next sequence, when condensers $C_3$ and $C_1$ are being compared, their voltages being 20 and 16 respectively, the voltmeter 6 measures a difference of 4 volts. Since the voltmeter 6 is calibrated to read the difference during the time consumed by one sequence (which would have been 2 volts), the reading, without correction would indicate a range change twice as great as actually existed. When the echo was missed, relays $R_5$ and $R_8$ did not operate. Thus neither of the release coils was energized, but on the next closing of key 13, arm 20 (or 21) was caused to step to tap 3 on the scale multiplier because of current applied to the coil through the contact on relay $R_5$. This put a resistance across terminals E of the voltmeter, thereby correcting the scale to read only one half the proper value. Since one half of four is two, the voltmeter reads the proper rate of range change for these increments of time.

Likewise, if more than one echo is missed, arm 20 (or 21) keeps advancing to positions 3, 4, etc. The resistors thus thrown across terminals E on voltmeter 6, correct the readings. The scale multipliers are so arranged in the diagram to correct for up to three missed echoes, but this is illustrative only and could be increased if desired.

In this same connection, if the rate of range change increased or decreased from sequence to sequence, as for example a 2 volt difference in sequence 1 and a 3 volt difference in sequence 2, one echo was missed, the voltage at terminals E would be 5 volts. However, since the scale multipliers have reduced the swing of the meter by one half, an average of 2.5 volts is indicated which, when interpreted by the voltmeter scale as range change, is the average rate of change over the whole period of 2 sequences.

It is thus seen that in any case met in practice the last available information on range change is immediately available to the operator. Even though echoes are missed and the rate of range change is itself changing from sequence to sequence, my invention gives accurate information in any case where the standard gear has made it available.

I claim:

1. A method of determining the rate of change of range comprising, transmitting a signal, starting the charging of a condenser at a uniform rate at the time of transmission of the signal, receiving the echo of the transmitted signal, charging each of a series of condensers successively at the same rate for the time interval between a respective transmitted signal and the received echo of such signal, and successively comparing the charges on the condensers in the order of their charging so that they indicate the rate of change of range.

2. Apparatus for determining the rate of change of range comprising, means for receiving transmitted signals, means for conditioning condensers to commence charging simultaneously with the transmission of said signal, means for receiving the echo of the transmitted signal, means for charging a series of condensers successively at a constant rate and for the time interval between the transmitted signal and the received echo of said signal, and means for comparing the successive charges on the condensers so that the rate of change of range is indicated.

3. Apparatus for determining the rate of change of range comprising, means for receiving the transmitted signal from the transmitter, means for shorting the condenser to be charged, means for receiving the echo signal from the receiver, means for charging a series of condensers at a constant rate and for the time interval between the transmitted signal and the received echo of the signal, means for comparing the successive charges on the condensers so that the rate of change of range is indicated, and means for compensating the indicating means for a missed echo signal.

4. A method of determining the rate of change of a varying quantity comprising the steps of: charging a first condenser at a constant rate for an interval proportional to the magnitude of said quantity at a given time; charging a second condenser at a constant rate for an interval proportional to the magnitude of said quantity at a different time; charging a third condenser at a constant rate for an interval proportional to the magnitude of said quantity at a still different time; and, simultaneously with said last mentioned step, comparing the charges on said first two condensers to indicate the change in magnitude of said quantity.

5. In the method described in claim 4, the additional steps of: discharging said first condenser; and comparing the charges of said second and third condensers to indicate the subsequent change in magnitude of said quantity.

6. In the method described in claim 4, the additional steps of: discharging said first condenser; re-charging said first condenser at a constant rate for an interval proportional to the magnitude of said quantity at an even different time; and, simultaneously with said last mentioned step, comparing the charges on said second and third condensers to indicate the subsequent change in magnitude of said quantity.

7. A method of determining the rate of change of a varying quantity comprising the steps of: charging a condenser at a constant rate for an interval proportional to the magnitude of said quantity at a given time; successively charging each of a series of condensers at said constant rate for intervals proportional to the magnitude of said quantity at different times; and successively comparing the charges on said condensers in the order of their charging to indicate the rate of change of said quantity.

8. In the method described in claim 7, the periods between successive of said different times being equal.

9. Apparatus for determining the rate of change of a varying quantity comprising: means for charging a first condenser at a constant rate for an interval proportional to the magnitude of said quantity at a given time; means for charging a second condenser at a constant rate for an interval proportional to the magnitude of said quantity at a different time; means for charging a third condenser at a constant rate for an interval proportional to the magnitude of said quantity at a still different time; and means for comparing the charges on the first and second condensers to indicate the rate of change of the magnitude of said quantity.

10. In the apparatus described in claim 9, means for separately discharging the condensers.

11. Apparatus for determining the rate of change of a varying quantity comprising: a series of condensers; means for successively charging the individual condensers of said series at a constant rate for periods proportional to the magnitude of said quantity at different times; and means for comparing the successive charges on said condensers to indicate the change of magnitude of said quantity.

12. In the apparatus described in claim 11, means for separately discharging said condensers.

13. In the apparatus described in claim 11, means for separately discharging said condensers; and means for compensating said means for comparing said successive charges if said means for discharging said condensers is not operated.

CHARLES A. HISSERICH.

REFERENCES CITED

The following references are of record in the file of this patent:

UNITED STATES PATENTS

| Number | Name | Date |
| --- | --- | --- |
| 2,021,766 | Bivens | Nov. 19, 1935 |
| 2,176,742 | La Pierre | Oct. 17, 1939 |
| 2,321,581 | Conover | June 15, 1943 |
| 2,323,019 | Dohle | June 29, 1943 |
| 2,336,929 | Doyle | Dec. 14, 1943 |

FOREIGN PATENTS

| Number | Country | Date |
| --- | --- | --- |
| 469,417 | Great Britain | July 26, 1937 |